US011143245B2

United States Patent
Copeland et al.

(10) Patent No.: US 11,143,245 B2
(45) Date of Patent: Oct. 12, 2021

(54) SELECTABLE DOG CLUTCH COUPLER FOR HYBRID TRANSMISSION

(71) Applicant: Schaeffler Technologies AG & Co. KG, Herzogenaurach (DE)

(72) Inventors: James Copeland, Massillon, OH (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/748,401

(22) Filed: Jan. 21, 2020

(65) Prior Publication Data

US 2020/0232515 A1    Jul. 23, 2020

Related U.S. Application Data

(60) Provisional application No. 62/794,935, filed on Jan. 21, 2019.

(51) Int. Cl.
| | |
|---|---|
| *F16D 11/14* | (2006.01) |
| *F16D 11/00* | (2006.01) |
| *F16D 48/06* | (2006.01) |
| *F16D 125/40* | (2012.01) |
| *F16D 121/24* | (2012.01) |

(52) U.S. Cl.
CPC ............. *F16D 11/14* (2013.01); *F16D 48/06* (2013.01); *F16D 2011/002* (2013.01); *F16D 2121/24* (2013.01); *F16D 2125/40* (2013.01); *F16D 2500/10412* (2013.01); *F16D 2500/10462* (2013.01)

(58) Field of Classification Search
CPC ............................................. F16D 2500/10493
USPC ......................................................... 192/69.9
See application file for complete search history.

(56) References Cited

U.S. PATENT DOCUMENTS

| | | | | |
|---|---|---|---|---|
| 5,597,058 | A * | 1/1997 | Ewer ...................... | F16D 11/14 180/247 |
| 10,683,900 | B2 * | 6/2020 | Mitrovic ................. | F16D 11/14 |
| 10,752,050 | B2 * | 8/2020 | Coletta .................... | B60B 27/02 |
| 2015/0176687 | A1 | 6/2015 | Smetana et al. | |
| 2016/0288879 | A1 * | 10/2016 | Ono ........................ | F16H 63/46 |
| 2017/0198766 | A1 * | 7/2017 | Onitake .................. | F16H 48/24 |
| 2018/0259012 | A1 * | 9/2018 | Shibata ................... | F16D 23/14 |
| 2019/0203779 | A1 * | 7/2019 | Baehr ..................... | F16D 11/14 |
| 2019/0331173 | A1 * | 10/2019 | Eschenburg ........... | B60K 17/02 |
| 2020/0217374 | A1 * | 7/2020 | Hedge ................. | F16D 43/2024 |
| 2020/0292009 | A1 * | 9/2020 | Kajikawa .................. | F16D 1/02 |
| 2020/0318692 | A1 * | 10/2020 | Asai ........................ | F16D 11/10 |

* cited by examiner

*Primary Examiner* — Charles A Fox
*Assistant Examiner* — Tracey E. Bell
(74) *Attorney, Agent, or Firm* — Lekeisha Suggs

(57) ABSTRACT

A clutch coupler assembly for a hybrid transmission having a first torque input, a second torque input, and a torque output comprises a sleeve fixed to the first torque input and an output hub connected to an output shaft of the torque output. A first ring is disposed on an outer diameter of the output hub and fixed to the sleeve such that the first torque input is always coupled to the torque output. An input hub is connected to an input shaft of the second torque input and a second ring is disposed on an outer diameter of the input hub. A sliding collar is mounted on the first ring and is configured to engage with the second ring to selectively connect the second torque input to the torque output.

18 Claims, 3 Drawing Sheets

SELECTABLE DOG CLUTCH COUPLER FOR HYBRID TRANSMISSION

TECHNICAL FIELD

The present disclosure relates in general to a selectable coupling in a hybrid transmission, and more particularly to a selectable dog clutch coupler.

BACKGROUND

US Patent No. 2015/0176687 discloses an electric axle with a two-gear transmission.

SUMMARY

According to an embodiment, a clutch coupler assembly for a hybrid transmission having a first torque input, a second torque input, and a torque output is disclosed. The coupler assembly comprises a sleeve fixed to the first torque input and an output hub connected to an output shaft of the torque output. A first ring is disposed on an outer diameter of the output hub and fixed to the sleeve such that the first torque input is always coupled to the torque output. An input hub is connected to an input shaft of the second torque input and a second ring is disposed on an outer diameter of the input hub. A sliding collar is mounted on the first ring and is configured to engage with the second ring to selectively connect the second torque input to the torque output.

In embodiments, the sliding collar is actuable between a first position where the sliding collar is engaged with the second ring such that the second input is connected with the torque output and a second position where the sliding collar is disengaged from the second ring such that the second torque input is not connected with the torque output. The second ring may include spline teeth formed on an outer surface thereof with chamfers on ends facing the sliding collar that are arranged to engage with spline teeth formed on an inner surface of the sliding collar when the sliding collar is in the first position. The input shaft may be connected to the input hub at a spline connection, the spline connection being formed from a driving engagement of first spline teeth disposed on an outer circumferential surface of the input shaft and second spline teeth disposed on an inner circumferential surface of the input hub. First and second thrust bearings may be disposed on axially opposite sides of the input hub and the output hub may be integrally formed with the output shaft.

In embodiments, the sleeve may be fixed to a ring gear of the first input at a first side and include an internal spline disposed on a second side, opposite the first side, arranged to engage with a spline formed on an outside of the first ring, wherein the internal spline of the sleeve is always fixed to the first ring such that the first input is always coupled to the torque output. The sleeve may further include a recess extending inwardly from a first side of the sleeve toward a second side. The sleeve may, for example, include three recesses that are uniformly-spaced circumferentially around the sleeve. Likewise, the sliding collar may include three openings that are uniformly-spaced around an outer surface of the sliding collar in such a manner as to permit the sliding collar and the sleeve to interlock when the sliding collar is moved in an axial direction to an engaged position where the second torque input is connected to the torque output.

In embodiments, a one-way clutch may be disposed between the input hub and the input shaft. The second torque input may transmit torque in a first direction and freewheel in a second direction when the sliding collar is engaged with the second ring such that the second input is connected with the torque output.

In embodiments, a method of operating a clutch coupler assembly for a hybrid transmission having a first torque input, a second torque input, and a torque output is disclosed. The method comprises fixing a sleeve that is attached to the first torque input to an output hub of the torque output such that the first torque input is always coupled to the torque output for transmitting drive torque therebetween. The method also includes actuating a sliding collar mounted on a first ring, disposed on an outer diameter of the output hub, in a first axial direction to a first position to couple the second torque input to the torque output. The method further includes actuating the sliding collar in a second axial direction opposite the first axial direction to a second position to decouple the second torque input from the torque output.

In embodiments, actuating the sliding collar in the first axial direction may include moving the sliding collar towards a second ring, disposed on an outer diameter of an input hub of the second torque input, such that teeth formed on an inner surface of the sliding collar engage with teeth formed on an outer diameter of the second ring thereby coupling the second torque input to the torque output for transmission of torque therebetween. Moreover, actuating the sliding collar in the second axial direction may include moving the sliding collar away from the second ring such that teeth formed on an inner surface of the sliding collar engage with teeth formed on an outer diameter of the first ring such that the second torque input is not connected to the torque output and drive torque is not transmitted therebetween. The method may further include transmitting, via a one-way clutch, torque from the second torque input to the torque output and freewheeling in a second direction when the sliding collar is engaged with the second ring such that the second input is connected to the torque output.

In embodiments, a clutch coupler assembly for a hybrid transmission having a first torque input, a second torque input, and a torque output is disclosed. The coupler assembly comprises a sleeve fixed to the first torque input and an output hub connected to an output shaft of the torque output. A first ring is disposed on an outer diameter of the output hub and fixed to the sleeve such that the first torque input is always coupled to the torque output. An input hub is connected to an input shaft of the second torque input and a second ring is disposed on an outer diameter of the input hub. A sliding collar is mounted on the first ring and is configured to engage with the second ring to selectively connect the second torque input to the torque output. An actuator is configured to move the sliding collar between a first position where the sliding collar is engaged with the second ring such that the second input is connected with the torque output and a second position where the sliding collar is disengaged from the second ring such that the second torque input is not connected with the torque output. The actuator may include a flanged piston configured to engage an internal groove formed in an inner surface of the sliding collar to move the sliding collar between the first position and the second position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein should be understood to be referring to the orientation of the structure depicted in the figures. If an object is said to be extending about an axis, then terms such as "radial," "circumferential" and "axial" are relative to the axis. For example, the "axial" direction is one along or parallel to an axis such as a central axis, and the "radial" direction is normal to the axial direction. The "circumferential" direction refers to movement about the axis. An "axial" surface is a surface extending at least partially in the radial direction but located at a particular axial point along the axis. Likewise, a "radial" surface is formed by a plane orthogonal to the axis and co-planar with a radius. A "circumferential" surface is a surface extending at least partially in the axial direction but located at a particular radial distance from the axis. "Inner" and "outer" also are relative to the axis; for example, an "inner surface" may be a surface facing the axis, and an "outer surface" may be a surface facing away from the axis. Rotation can be relative to the axis. These terms can be used as explained above unless otherwise noted.

Figure 1:
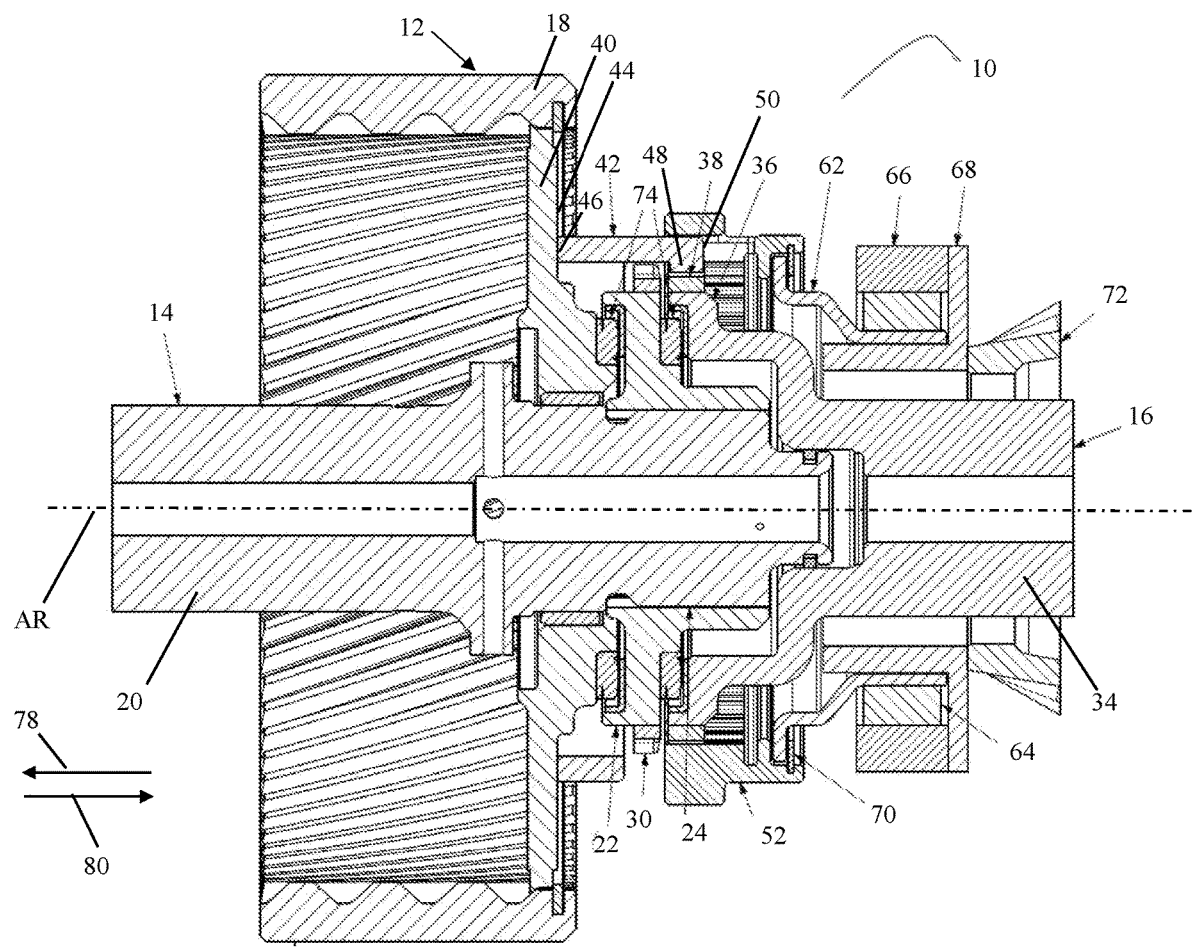
FIG. 1 shows a cross-sectional view of a dog clutch switchable coupler assembly, according to one embodiment.
Figure 2:
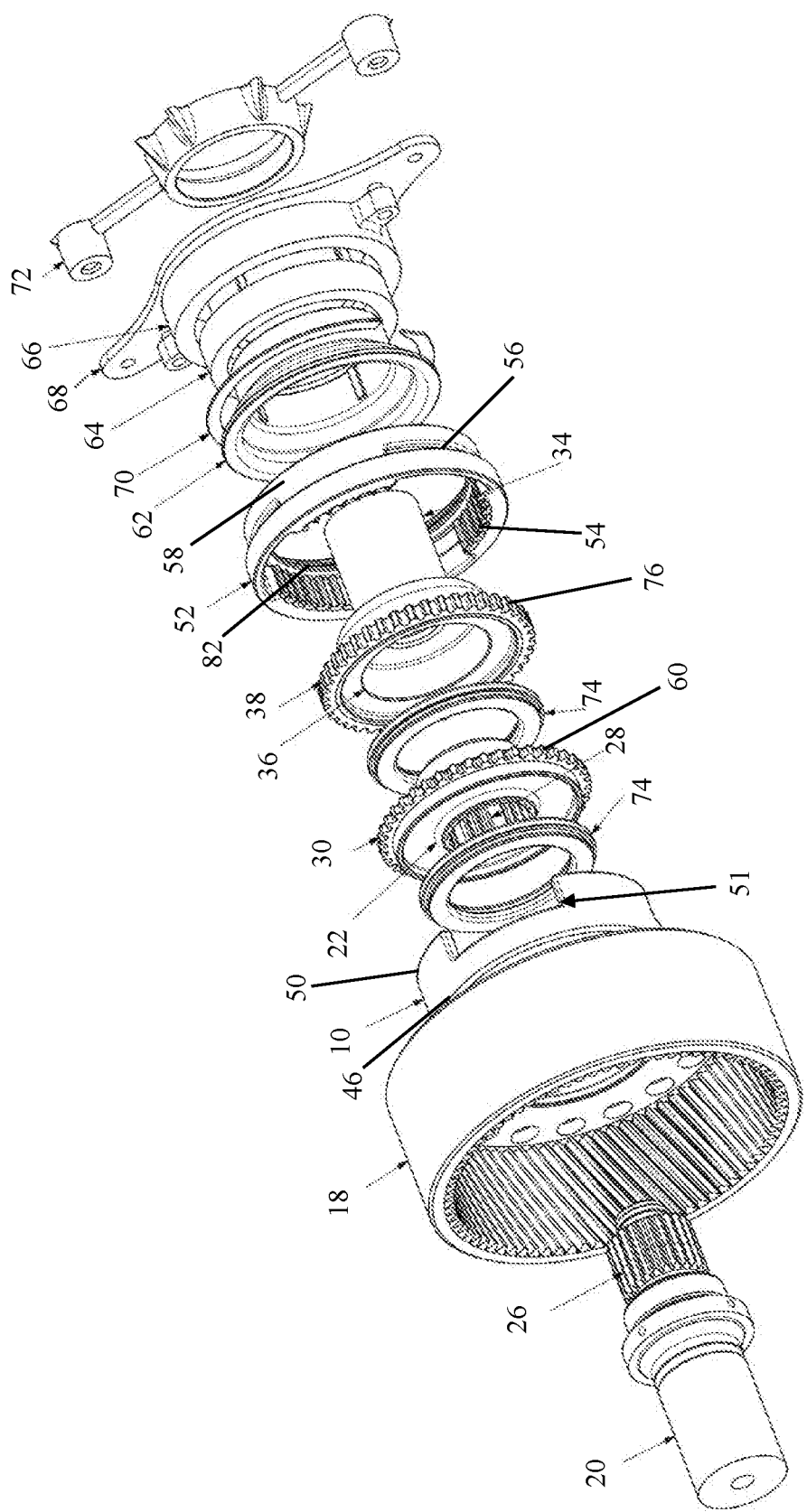
FIG. 2 shows an exploded perspective view of the dog clutch switchable coupler assembly of FIG. 1, according to one embodiment.

Various figures are shown and referred to below. FIG. 1 shows a dog clutch switchable coupler assembly 10, according to one embodiment. FIG. 2 shows an exploded view of the dog clutch switchable coupler 10 of FIG. 1. The following description is made in reference to FIGS. 1-2.

Dog clutch switchable coupler, or switchable coupler, 10 is provided for use in a hybrid transmission application having a first torque input 12, a second torque input 14, and a torque output 16. As shown in the figures, a ring gear 18 of a planetary gear set (other components of planetary gear set not shown) is the driver for first torque input 12. Second torque input 14 includes input shaft 20 splined to input hub 22 at spline connection 24. Spline connection 24 is formed from the driving engagement of spline teeth 26 disposed at one end of input shaft 20 on an outer circumferential surface thereof and spline teeth 28 disposed on an inner circumferential surface of input hub 22. Input ring 30 is disposed on an outer circumferential surface of input hub 22. Input hub 22 also includes thrust bearings 74 disposed on axially opposite sides of hub 22. Torque output 16 includes output shaft 34 and output hub 36. Output hub 36 may be integrally formed with output shaft 34 and include an externally-splined ring 38 disposed on an outer circumferential surface thereof.

Ring gear 18 of first torque input 12 includes hub 40 attached thereto. Sleeve 42 is rigidly fixed to radial wall 44 of hub 40 at a first side 46 of sleeve 42. Sleeve 42 includes internal spline 48 disposed on a second side 50, opposite first side 46, arranged to engage with externally-splined ring 38. Internal spline 48 of sleeve 42 is always coupled to the externally-splined ring 38 on the outer diameter of the output shaft hub 36, thus ensuring that first input 12 is always coupled to the torque output 16. In this way, torque is transmitted from the first torque input to the output shaft of the torque output. The splined end, or side, 50 of sleeve 42 includes recess, or cut-away portion, 51 extending inwardly from second side 50 toward first side 46. Sleeve 42 may include three recesses, or cut-away portions, 51 that are uniformly-spaced circumferentially around sleeve 42. For example, sleeve 42 may include three recesses, or cut-away portions, 51 uniformly-spaced in sixty-degree zones (total of 180 degree removed) around a circumference of sleeve 42 so that only half of the spline teeth 76 of the externally-splined output ring 38 are being engaged by sleeve 42.

A sliding collar 52 having spline teeth 54 formed on an inner surface is mounted on the externally-splined ring 38 on the output shaft hub 36. Sliding collar 52 includes openings, or cut-away zones, 56 defined in outer surface 58. Sliding collar 52 may include, for example, three openings, or cut-away zones, 56 that are uniformly-spaced around outer surface 58 in sixty-degree zones in a similar fashion as the recesses 51 of sleeve 42. The openings, or cut-away zones, 56 of sliding collar 52 enable or allow for sliding collar 52 and sleeve 42 to interlock when sliding collar 52 is moved or slid in a first axial direction 78 to an engaged position where the second torque input 14 is coupled to the torque output 16. That is, sliding collar 52 may be moved in first axial direction 78 toward input ring 30 such that sliding collar 52 engages with input ring 30 to couple second torque input 14 to torque output 16. Second torque input 14 may be decoupled from torque output 16 by moving collar 52 in a second axial direction 80, opposite first axial direction 78, so that collar 52 is in a disengaged position. That is, sliding collar 52 is moved away from input ring 30 for disengagement.

Spline teeth 60 formed on outer surface of input ring 30, which is disposed on the outside of input hub 22, may include chamfers on ends facing sliding collar 52 that result in pointed ends on the spline teeth 60 that facilitate engagement with similarly pointed ends on the spline teeth 54 formed on inner surface of sliding collar 52. Spline teeth 60 of input ring 30 are also equipped with back tapers on the flanks; which, when engaged with the similarly back-tapered spline teeth 54 of the sliding collar 52, resist disengagement between input ring 30 and sliding collar 52 once they are engaged and transmitting drive torque. The back-tapered spline teeth with pointed ends are referred to as "dog teeth," an externally-splined ring incorporating these "dog teeth" is known as a "dog ring," and the type of mechanical coupling utilizing these components (such as this one) is known as a "dog clutch."

As discussed above, actuation of sliding collar 52 in first and second axial directions 78, 80 allows for second torque input 14 to be selectively coupled and decoupled from torque output 16, while first torque input 12 remains permanently coupled to torque output 16 via sleeve 42. Actuation consists of moving the sliding collar 52 axially through the necessary range of travel to fully engage and disengage with the teeth 60 on the input ring 30 (which may also be referred to as "dog ring" 30). For example, sliding collar 52 in FIG. 1 may be actuated such that it moves in first axial direction 78 towards input ring 30 such that collar 52 teeth 54 fully engage with input ring 30 teeth 60 such that drive torque may be transmitted from second torque input 14 to torque output 16. This may be referred to as a first mode of operation where collar 52 is in an engaged position. That is, both first torque input 12 and second torque input 14 are locked, or engaged with, torque output 16. Likewise, second torque input 14 may be disengaged or decoupled from torque output 16 through further actuation of sliding collar 52. For example, sliding collar 52 may be actuated such that it moves in second axial direction 80 away from input ring 30 such that collar 52 teeth 54 fully disengage with input ring 30 teeth 60. In this way, torque is no longer being transmitted from second torque input 14 to torque output 16. This may be referred to as a second mode of operation where collar 52 is in a disengaged position. That is, only first torque input 12 is locked, or engaged with, torque output 16 and second torque input 16 is disengaged or freewheeling in both directions.

Figure 3:
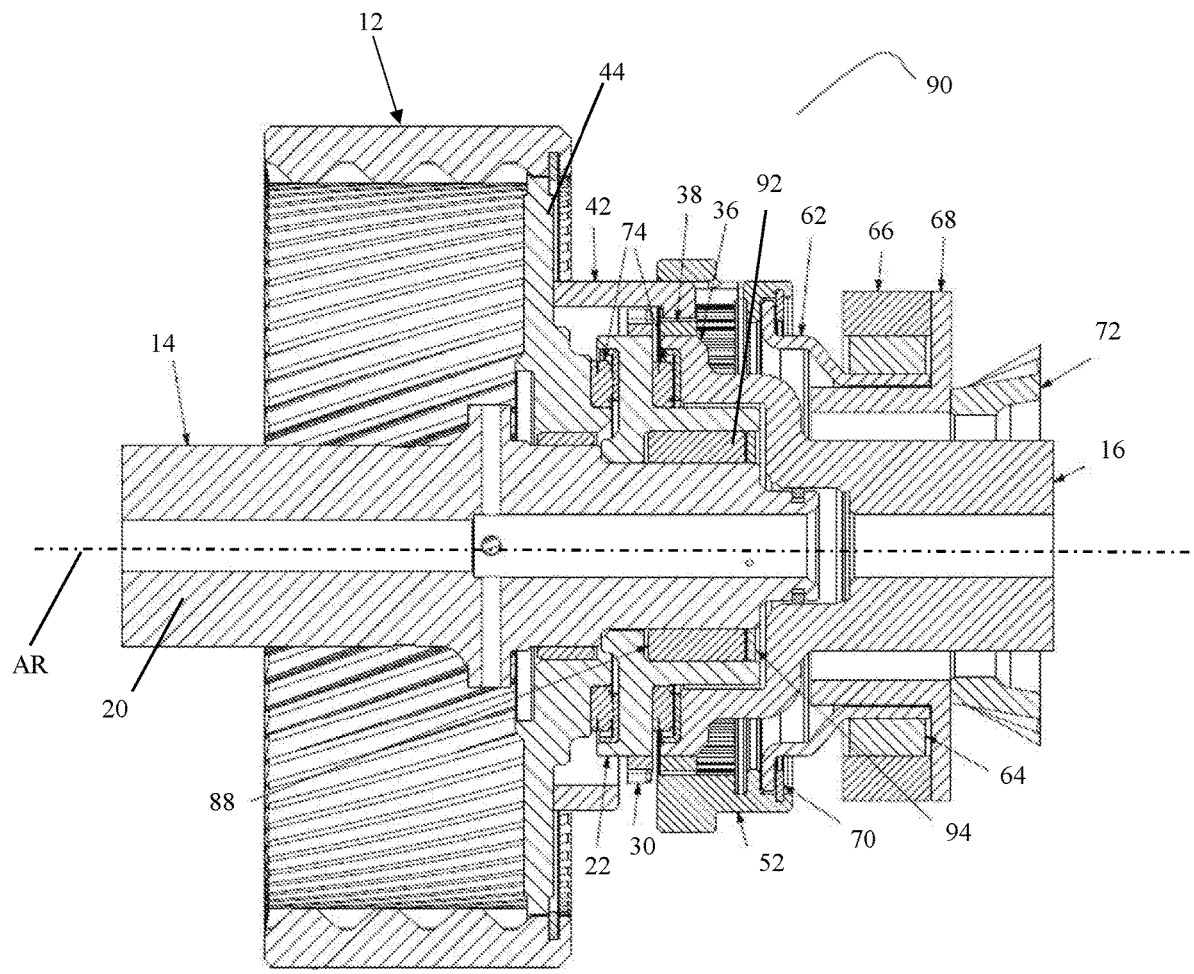
FIG. 3 shows a cross-sectional view of an alternative embodiment of the dog clutch switchable coupler assembly of FIG. 1 with a one-way clutch.

Referring now to FIG. 3, an alternative embodiment of the dog clutch switchable coupler assembly 10 of FIG. 1 is shown with one-way clutch 88 (hereinafter "OWC"). Common features of the switchable coupler 10 of FIG. 1 and coupler 90 of FIG. 3 are designated with the same reference character for clarity. OWC 88 is disposed inside of input hub 22 between input shaft 20 and externally-splined input ring 30. Spline connection 24 shown in FIG. 1 between input hub 22 and input shaft 20 is removed and replaced with OWC 88. Specifically, input shaft 20 spline 26 (see FIG. 2) is replaced with inner race geometry for OWC 88 and input hub 22 spline 28 (see FIG. 2) is replaced with outer race geometry for OWC 88. For example, OWC 88 may include centering washer 94 and rollers 92. Locking elements, such as rollers 92, along with their energizing springs and cage fit between these inner and outer races. The addition of OWC 88 allows for second torque input 14 to transmit torque in one preferred direction when engaged with sliding collar 52, and freewheel in an opposite direction.

Actuation of the switchable coupler disclosed herein may be accomplished using a selector fork (as commonly used in a manual transmission or DCT, for example), or by other similar means. In embodiments disclosed herein, actuator system includes piston 62, collar snap ring 70, and motor rotor 64 disposed in motor housing 66. Motor housing 66 may include base portion 68 with holes formed therein for coupling with transmission housing via bracket 72. Actuation may be accomplished, for example, by using flanged piston 62 that engages an internal groove 82 formed in an inner surface at one end of sliding collar 52. Piston 62 may be advanced and retracted by a screw mechanism (ball screw, acme screw, for example.) which transforms rotary motion from an electric motor into linear motion perpendicular to the plane of motor rotation. It may be advantageous to use the screw-type linear actuator over, for example, a simple solenoid, because it is self-holding. That is, once the actuator has advanced the piston to the desired position, electric power to the actuator may be shut off and friction within the screw mechanism will be sufficient to hold the piston in place. This characteristic helps to minimize the amount of electrical energy required by the system.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 10 dog clutch switchable coupler
12 first torque input
14 second torque input
16 torque output
18 ring gear
20 input shaft
22 input hub
24 spline connection
26 spline teeth
28 spline teeth
30 input ring
34 output shaft
36 output shaft hub
38 externally-splined output ring
40 hub
42 sleeve
44 radial wall
46 first side
48 internal spline
50 second side
51 cutaway recesses in sleeve 42
52 sliding collar
54 spline teeth
56 Cutaway recesses in sliding collar 52
58 outer surface
60 spline teeth
62 piston
64 motor rotor
66 motor housing
68 base portion
70 collar snap ring
72 bracket
74 bearings
76 spline teeth
78 first axial direction
80 second axial direction
82 internal groove
88 one-way clutch
90 coupler
92 rollers
94 washer

What is claimed is:

1. A clutch coupler assembly for a hybrid transmission having a first torque input, a second torque input, and a torque output, the assembly comprising:
   a sleeve fixed to the first torque input;
   an output hub connected to an output shaft of the torque output;
   a first ring disposed on an outer diameter of the output hub and fixed to the sleeve such that the first torque input is always coupled to the torque output;
   an input hub connected to an input shaft of the second torque input;
   a second ring disposed on an outer diameter of the input hub; and
   a sliding collar mounted on the first ring and configured to engage with the second ring to selectively connect the second torque input to the torque output.

2. The clutch coupler assembly of claim 1, wherein the sliding collar is actuable between a first position where the sliding collar is engaged with the second ring such that the second input is connected with the torque output and a second position where the sliding collar is disengaged from the second ring such that the second torque input is not connected with the torque output.

3. The coupler assembly of claim 2, wherein the second ring includes spline teeth formed on an outer surface thereof with chamfers on ends facing the sliding collar that are arranged to engage with spline teeth formed on an inner surface of the sliding collar when the sliding collar is in the first position.

4. The coupler assembly of claim 1, wherein the input shaft is connected to the input hub at a spline connection, the spline connection being formed from a driving engagement of first spline teeth disposed on an outer circumferential surface of the input shaft and second spline teeth disposed on an inner circumferential surface of the input hub.

5. The coupler assembly of claim 1, further comprising first and second thrust bearings disposed on axially opposite sides of the input hub.

6. The coupler assembly of claim 1, wherein the output hub is integrally formed with the output shaft.

7. The coupler assembly of claim 1, wherein the sleeve is fixed to a ring gear of the first input at a first side and includes an internal spline disposed on a second side, opposite the first side, arranged to engage with a spline formed on an outside of the first ring, wherein the internal spline of the sleeve is always fixed to the first ring such that the first input is always coupled to the torque output.

8. The coupler assembly of claim 1, wherein the sleeve includes a recess extending inwardly from a first side of the sleeve toward a second side.

9. The coupler assembly of claim 8, wherein the sleeve includes three recesses that are uniformly-spaced circumferentially around the sleeve.

10. The coupler assembly of claim 9, wherein the sliding collar includes three openings that are uniformly-spaced around an outer surface of the sliding collar in such a manner as to permit the sliding collar and the sleeve to interlock when the sliding collar is moved in an axial direction to an engaged position where the second torque input is connected to the torque output.

11. The coupler assembly of claim 1, further comprising a one-way clutch disposed between the input hub and the input shaft.

12. The coupler assembly of claim 11, wherein the second torque input transmits torque in a first direction and freewheels in a second direction when the sliding collar is engaged with the second ring such that the second input is connected with the torque output.

13. A method of operating a clutch coupler assembly for a hybrid transmission having a first torque input, a second torque input, and a torque output, the method comprising:
   fixing a sleeve that is attached to the first torque input to an output hub of the torque output such that the first torque input is always coupled to the torque output for transmitting drive torque therebetween;
   actuating a sliding collar mounted on a first ring, disposed on an outer diameter of the output hub, in a first axial direction to a first position to couple the second torque input to the torque output; and
   actuating the sliding collar in a second axial direction opposite the first axial direction to a second position to decouple the second torque input from the torque output.

14. The method of claim 13, wherein actuating the sliding collar in the first axial direction includes moving the sliding collar towards a second ring, disposed on an outer diameter of an input hub of the second torque input, such that teeth formed on an inner surface of the sliding collar engage with teeth formed on an outer diameter of the second ring thereby coupling the second torque input to the torque output for transmission of torque therebetween.

15. The method of claim 13, wherein actuating the sliding collar in the second axial direction includes moving the sliding collar away from the second ring such that teeth formed on an inner surface of the sliding collar engage with teeth formed on an outer diameter of the first ring such that the second torque input is not connected to the torque output and drive torque is not transmitted therebetween.

16. The method of claim 13, further comprising: transmitting, via a one-way clutch, torque from the second torque input to the torque output and freewheeling in a second direction when the sliding collar is engaged with the second ring such that the second input is connected to the torque output.

17. A clutch coupler assembly for a hybrid transmission having a first torque input, a second torque input, and a torque output, the assembly comprising:
   a sleeve fixed to the first torque input;
   an output hub connected to an output shaft of the torque output;
   a first ring disposed on an outer diameter of the output hub and fixed to the sleeve such that the first torque input is always coupled to the torque output;
   an input hub connected to an input shaft of the second torque input;
   a second ring disposed on an outer diameter of the input hub;
   a sliding collar mounted on the first ring and configured to engage with the second ring to selectively connect the second torque input to the torque output; and
   an actuator configured to move the sliding collar between a first position where the sliding collar is engaged with the second ring such that the second input is connected with the torque output and a second position where the sliding collar is disengaged from the second ring such that the second torque input is not connected with the torque output.

18. The clutch coupler assembly of claim 17, wherein the actuator includes a flanged piston configured to engage an internal groove formed in an inner surface of the sliding collar to move the sliding collar between the first position and the second position.

* * * * *